Dec. 9, 1958 W. T. LINK 2,863,609
COIL WINDING MECHANISM
Filed May 19, 1955
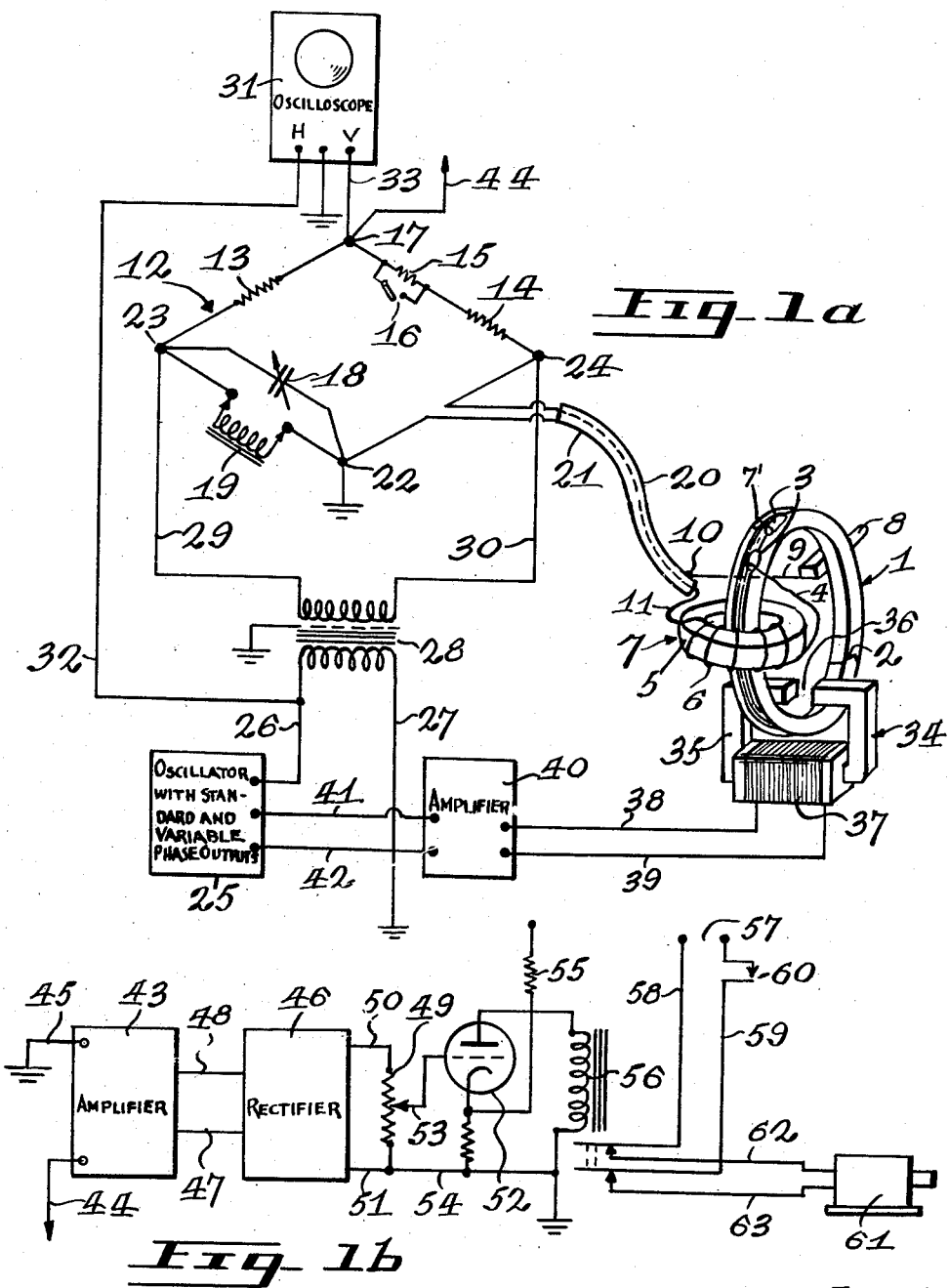
Inventor
W. T. LINK
By Robert B. Harmon
Attorney

United States Patent Office 2,863,609
Patented Dec. 9, 1958

2,863,609

COIL WINDING MECHANISM

William T. Link, Montreal, Quebec, Canada, assignor to Northern Electric Company, Limited, Montreal, Quebec, Canada, a corporation of Canada Application May 19, 1955, Serial No. 509,607

4 Claims. (Cl. 242—4)

This invention relates to coil winding mechanism and more particularly to the apparatus for automatically producing ring type coils with a precisely predetermined inductance.

In the manufacture of ring type coils having a magnetizable core, it is the present practice to wind a series of coils, each having cores of the same permeability, with a predetermined number of turns appropriate to the permeability of the core used and to adjust the coils so wound to the specified inductance by the removal of turns of the strand with which they are wound. It has been necessary to follow this procedure because the variation, occurring in the permeability characteristic of the core, influences the measured inductance of the completed coils.

It is an object of this invention to provide the apparatus for winding ring type coils to precise inductance without final adjustments notwithstanding normal variations in the permeability of the core rings.

Another object of this invention is to provide the apparatus for automatically terminating the winding of the coils when the coils have attained a precise predetermined electromagnetic inductance value.

These and other objects of the invention are obtained by including the strand, which has been inserted in a driven rotatable shuttle and which is continually wound on a core to form a coil, in the unknown arm of an excited Wheatstone impedance bridge which has been unbalanced by the insertion of a standard inductance element in the opposing arm of the ratio pair; opposing the variable flux field, established by the oscillating current flowing through the turns of the strand remaining in the shuttle after the coil has been wound, by arranging an opposing external varying magnetic field to link the turns in the shuttle but not those in the coil; developing a biasing potential controlled by and in proportion to the unbalanced condition of the bridge and associating this biasing potential with an electronic device, so arranged that it is normally non-conductive but becomes conductive when the bridge approaches balance, which controls means for automatically terminating the winding of the coils when a precise inductance value has been obtained.

The invention will be better understood by referring to the following description, taken in conjunction with the accompanying drawing in which:

Figs. 1A and 1B illustrate a diagrammatic representation of the mechanism embodying the invention.

Considering the drawing, the winding mechanism includes the metallic flexible shuttle 1 of the ring type, split at 2 and insulated thereto to form an electrically insulated break, equipped with sliders 3 for guiding a strand 4 as it is being superimposed on a core 5 to form a winding 6 of a coil generally shown as 7, one end of the strand 4, bared of insulation, protruding through the opening 7' and attached thereat to the shuttle 1, the shuttle 1 being arranged in slidable and continuous electrical engagement with spring loaded brush 8 which is connected by conductor 9 to the terminal 10, the other end of strand 4 being connected to terminal 11.

Associated with coil 7 is a Wheatstone impedance bridge, generally shown by 12, which consists of resistance elements 13, 14, 15, elements 13 and 14 being equal in resistance value and element 15 being capable of being shorted out of the bridge 12 by switch 16, joined at the junction 17 to form one pair of ratio arms and variable capacitance element 18 with a standard inductance element 19, having the desired inductance, and the capacitance element formed by the conductors 20, 21, the latter being shielded by the former to prevent the inductance of interfering voltages by extraneous electric and magnetic fields in the bridge 12 and to minimize variation in the capacitance between conductors 20 and 21, and connected to the terminals 10, 11 respectively, to form the other ratio pair by being joined at the junction 22, the loop for the bridge 12 being completed by joining the two ratio pairs at the junctions 23, 24. Associated with the bridge 12 is the exciting oscillator 25, arranged to furnish a standard phase output and a variable phase output, which is connected, by conductors 26, 27, to the primary of isolating transformer 28, the secondary of transformer 28 being connected by conductors 29, 30 to the junctions 23, 24 of bridge 12. Also associated with the bridge 12 is the oscilloscope 31 which is connected to oscillator 25 by conductors 32, 26 and to junction 17 by conductor 33.

Associated with the shuttle 1 is an inductive correction device, generally indicated by 34, consisting of magnetizable core 35, having an air gap 36 arranged to permit the passage of the strand 4 as it sweeps across the cross section area of the shuttle 1, and winding 37 which is connected by conductors 38, 39 to amplifier 40 which is connected to oscillator 25 by conductors 41, 42.

The controlling means for the shuttle driving mechanism consists of amplifier 43 connected to the junction 17 by conductor 44 and to ground by conductor 45, rectifier 46 connected thereto by conductors 47, 48, motor control circuit consisting of potentiometer 49 connected to rectifier 46 by conductors 50, 51, thyratron tube 52 connected to potentiometer 49 by wiper 53 and conductor 54, biasing resistance element 55, electromagnetic switch 56, energy source 57 connected to switch 56 by conductors 58, 59 through switch 60. The mechanism driving motor 61 is connected to switch 56 by conductors 62, 63.

In preparing the device for its running operation, bridge 12 is first corrected for the capacitance between conductors 20, 21 by adjusting it to the standard or the null condition by exciting the bridge 12 by a standard frequency from oscillator 25 and adjusting the bridge to the null condition by means of the capacitance element 18, without the strand 4 or the standard inductance element 19 being connected into the bridge circuit and with resistance 15 out of the bridge ratio arms, this condition being noted on oscilloscope 31. In order to insure that coil 7 will operate under the same conditions when placed in service, the voltage and frequency characteristics of oscillator 25 should be adjusted to meet these conditions.

In order to terminate the winding operation of the device when the apparent inductance between terminals 10 and 11 has reached a value equal to that of the standard inductance element 19, a further adjustment is made in the device. To carry out this adjustment, with bridge 12 in the balanced condition as heretofore described, standard inductance element 19 is now inserted in its respective arm of the bridge 12 and a coil 7 is wound and manually adjusted to have an inductance equal in value to that of standard inductance element 19. Since some devices may have a tendency to overrun its terminating position when the coil 7 has attained its required inductance, thus adding unwanted turns to the coil, bridge 12 may be slightly unbalanced whereby the device will terminate its winding operation just before this point is reached. In this adjustment bridge 12, with coil 7 as heretofore described maintained in the bridge circuit, is unbalanced by inserting resistance element 15 in series with resistance element 14 by opening switch 16, the value of the resistance of resistance element 15 being such as to allow this condition, it being found in practice to be about two percent of the resistance of resistance element 14. With this unbalance condition of bridge 12, potentiometer 49 is adjusted so that thyratron tube 52 will just become conducting.

The energy supplied to inductive correction device 34 is now adjusted so that the effect of the turns of strand 4 remaining in shuttle 1, after the winding of a coil 7 has been completed, is counteracted. To carry out this adjustment bridge 12 is again unbalanced by removing resistance element 15 from the circuit of bridge 12 by the closing of switch 16 and several turns of strand 4 are inserted in shuttle 1 and are connected in series with coil 7 which has remained in the bridge circuit. Bridge 12 is now balanced by the adjustment of the variable phase of oscillator 25 and the amplification of amplifier 40.

The device, as now adjusted, will permit the winding of a plurality of coils having the same inductance as coil 7, as heretofore described, without any further adjustments. This operation is carried out by removing the wound coil 7 and substituting a core 5 therefor, inserting a supply of strand 4 in the shuttle 1, the ends of which strand are connected to the terminals 10, 11, so that strand 4 is now in the unknown arm of the bridge circuit of bridge 12, and the standard inductance element 19 is connected into the opposing arm of the bridge 12. Since it is not practical to insert in the shuttle 1, the exact amount of strand 4 required to wind the coil 7 with the precisely predetermined inductance, the amount of strand 4 inserted therein should be equal to the minimum required for the predetermined inductance and several additional turns.

The mechanism is now set in motion by closing switch 60 which permits shuttle 1 to superimpose strand 4 on core 5. Since bridge 12 is unbalanced, an oscillating current flows through the strand 4 and, as a result, a potential, counter to the impressed potential, is produced in coil 7, the magnitude depending on the number of turns of strand 4 wound thereon and hence on the inductance of coil 7. Upon this counter potential becoming equal to the potential developed across the standard inductance element 19, the bridge 12 would normally be balanced. However, there also appears in the unknown arm of the bridge 12 a potential, aiding the impressed potential, the magnitude depending on the mutual inductance between the coil 7 and the turns of strand 4 remaining in shuttle 1. Since, as described heretofore, several turns of strand 4 remain in shuttle 1 after coil 7 has been completely wound, an unwanted potential, which influences the measured inductance value of coil 7, is added. In order to neutralize this unwanted potential, an inductive correction device 34 is continuously excited by oscillator 25, the phase of the current flowing in the coil 34 being arranged so that the magnetic flux, encircling the turns of strand 4 remaining in shuttle 1, induces in said turns a potential equal and opposite to the unwanted potential. Since it is necessary to measure the inductance value of coil 7 only when it approaches its final value, the flux across the air gap 36 of coil 34 is adjusted to a value which should be twice that in core 5 when coil 7 has been completely wound.

Simultaneously in proportion to the unbalance condition of bridge 12, a biasing potential is being developed and applied to the grid of the thyratron tube 52, normally non-conducting but becoming conducting when bridge 12 reaches two percent unbalance as heretofore described, which causes the actuation of the electromagnetic switch 56 to open its contacts thus automatically terminating the winding operation of the mechanism.

The circuit for the biasing of thyratron tube 52 may be traced from junction 17 of bridge 12 through conductor 44 to amplifier 43 and thence to ground through conductor 45, amplifier 43 being connected to rectifier 46 through conductors 47, 48 which rectifier is connected to potentiometer 49 by conductors 50, 51, potentiometer 49 being connected to thyratron tube 52 by wiper 53 and conductor 54.

What is claimed is:

1. Apparatus adapted for use with a ring type coil winding mechanism having a driving means therefor, the mechanism including a rotatable electrical conducting shuttle in which a predetermined number of turns of strand has been inserted, the shuttle being arranged to interlink a core and to superimpose the strand thereon to form a coil, which apparatus includes in combination therewith: a null Wheatstone bridge arrangement; means for including the strand being wound in the unknown arm of the bridge; a standard inductance element, having the desired inductance, inserted in the balancing arm of the bridge; oscillating means to energize the bridge circuit; inductive correction device interlinking the shuttle; means for applying to the inductive correction device a current of predetermined magnitude and phase; an electronic device; biasing means associated with the bridge circuit for developing a biasing potential in proportion to the unbalance condition of the bridge circuit, said biasing means normally rendering the electronic device non-conductive but making it conductive upon the balancing of the bridge circuit; motor control means in association with the electronic device so arranged that the said driving means is deenergized upon said device becoming conductive.

2. Apparatus adapted for use with a ring type coil winding mechanism having a driving means therefor, the mechanism including a rotatable electrical conducting shuttle in which a predetermined number of turns of strand has been inserted, the shuttle being arranged to interlink a core and to superimpose the strand thereon to form a coil, which apparatus includes in combination therewith: a null Wheatstone bridge arrangement; means for including the strand being wound in the unknown arm of the bridge; a standard inductance element having the desired calibration, inserted in the balancing arm of the bridge; oscillating means to energize the bridge circuit; inductive correction device interlinking the shuttle; an adjustable oscillator whereby a flux of a predetermined magnitude and phase is developed by the inductive correction device; a gas filled electron tube means; biasing means in association with said bridge for developing a biasing potential in response to the continual approach to the balancing of the bridge, said biasing means normally rendering the electron tube means non-conductive but making it conductive upon the balancing of the bridge; motor control means in association with the electron tube means arranged so that the driving means is deenergized upon said electron tube becoming conductive.

3. Apparatus adapted for use with a ring type coil winding mechanism having a driving means therefor, the mechanism including a rotatable electrical conducting shuttle in which a predetermined number of turns of strand has been inserted, the shuttle being arranged to interlink a coil and to superimpose the strand thereon to form a coil, which apparatus includes in combination therewith: a null Wheatstone bridge circuit; means for including the strand being wound in the unknown arm of the bridge; a standard inductance element, having the desired inductance, inserted in the balancing arm of the bridge; oscillating means to energize the bridge circuit; means interlinking the shuttle; means for applying to the inductive correction device a current of predetermined magnitude and phase; an electronic device; biasing means included in the bridge circuit for developing a biasing potential in proportion to the unbalance condition of the bridge circuit, said biasing means normally rendering the electronic device non-conductive but making it conductive upon the bridge circuit approaching a predetermined degree of balance, means included in the bridge circuit for adjusting the balance thereof; motor control means in association with the electronic device so arranged that the said driving means is deenergized upon said device becoming conductive.

4. Apparatus adapted for use with a ring type coil winding mechanism having a driving means therefor, the mechanism including a rotatable electrical conducting shuttle in which a predetermined number of turns of strand has been inserted, the shuttle being arranged to interlink a core and to superimpose the strand thereon to form a coil, which apparatus includes in combination therewith: bridge balancing means; means for including the strand being wound and an inductive element of predetermined calibration in the unknown arm and in the balancing arm of the bridge balancing means respectively; means for applying an oscillating current to the bridge balancing means; inductive correction device interlinking the shuttle; means for applying to the inductive correction device a current of predetermined magnitude and phase; an electrical device; biasing means associated with the bridge balancing means for developing a biasing potential in response to the continual approach to the balancing of the bridge balancing means, the biasing means arranged normally to render the electrical device non-conductive but making it conductive upon the balancing of the bridge balancing means; motor control means in association with the electrical device so arranged that the said driving means is deenergized upon said device becoming conductive.

References Cited in the file of this patent

UNITED STATES PATENTS

| | | |
|---|---|---|
| 2,401,954 | Newton | June 11, 1946 |
| 2,683,567 | Lense | July 13, 1954 |
| 2,697,559 | Scarce et al. | Dec. 21, 1954 |